(12) United States Patent
Heywood et al.

(10) Patent No.: US 8,147,194 B2
(45) Date of Patent: Apr. 3, 2012

(54) TURBINE ENGINE COMPONENTS

(75) Inventors: Thomas D. Heywood, Phoenix, AZ (US); Edward S. Wright, Plactas, NM (US); James D. Prost, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 701 days.

(21) Appl. No.: 12/266,150

(22) Filed: Nov. 6, 2008

(65) Prior Publication Data

US 2010/0111691 A1    May 6, 2010

(51) Int. Cl.
*F01D 25/00* (2006.01)

(52) U.S. Cl. ...................... 415/216.1; 416/174

(58) Field of Classification Search .............. 464/79, 464/99; 416/132 R, 132 A, 140, 174; 415/104, 415/107, 119, 124.2, 134, 135, 142, 231, 415/216.1
See application file for complete search history.

(56) References Cited

U.S. PATENT DOCUMENTS

| | | | |
|---|---|---|---|
| 0,326,941 A | 9/1885 | Browne | |
| 2,647,380 A | 8/1953 | Troeger et al. | |
| 2,837,961 A | 6/1958 | Reinecke | |
| 3,124,942 A | 3/1964 | Rothfuss et al. | |
| 3,508,633 A | 4/1970 | Nishimura et al. | |
| 3,985,000 A | 10/1976 | Hartz | |
| 4,173,128 A | 11/1979 | Corvelli | |
| 4,276,758 A | 7/1981 | Coman et al. | |
| 4,540,385 A | 9/1985 | Krude | |
| 4,569,667 A | 2/1986 | Hannibal et al. | |
| 5,364,309 A | 11/1994 | Heidrich et al. | |
| 5,433,674 A * | 7/1995 | Sheridan et al. | 475/346 |
| 5,860,275 A * | 1/1999 | Newton et al. | 60/226.1 |
| 6,223,616 B1 * | 5/2001 | Sheridan | 74/468 |
| 6,695,705 B2 * | 2/2004 | Stervik | 464/79 |
| 7,025,686 B1 | 4/2006 | Aiken | |
| 7,080,436 B2 | 7/2006 | Durand | |
| 7,677,980 B2 * | 3/2010 | Geislinger et al. | 464/92 |
| 2006/0228573 A1 | 10/2006 | Finton et al. | |
| 2007/0049379 A1 | 3/2007 | Faass et al. | |

* cited by examiner

*Primary Examiner* — Seungsook Ham
(74) *Attorney, Agent, or Firm* — Ingrassia Fisher & Lorenz, P.C.

(57) ABSTRACT

A turbine engine component includes a shaft and two sets of hollow radial plates. The shaft includes an axial section forming a portion of a main passage having a substantially uniform diameter. The axial section has two ends and a center located substantially halfway between the two ends. The first set of hollow radial plates extends radially outwardly from the shaft at a first axial location between the center and a first end of the axial section. Each hollow radial plate is hollow and has an interior surface defining annular chambers surrounding and in flow communication with the main passage. The second set of hollow radial plates extends radially outwardly from the shaft at a second axial location between the center and a second end of the axial section. Each hollow radial plate has an interior surface defining annular chambers surrounding and in flow communication with the main passage.

20 Claims, 4 Drawing Sheets

TURBINE ENGINE COMPONENTS

STATEMENT REGARDING FEDERALLY SPONSORED RESEARCH OR DEVELOPMENT

This inventive subject matter was made with Government support under W56HZV-06-C-0173 awarded by the United States Army. The Government has certain rights in this inventive subject matter.

TECHNICAL FIELD

The inventive subject matter generally relates to turbine engines, and more particularly relates to components for use in turbine engines.

BACKGROUND

Turbine engines may be employed to provide power to one or more vehicle components, such as a generator, a transmission, a gearbox, or another type of vehicle component for marine, industrial, or land systems. Generally, a turbine engine includes a rotatable drive shaft that is coupled at a first end to one or more turbine wheels. A second end of the drive shaft extends through a gearbox housing of a gear train and is coupled to a gearbox shaft. The gearbox shaft transfers power from the drive shaft to the vehicle components. Many conventional gearboxes house fluid, such as oil, for lubricating the vehicle components or other gearbox components. The fluid may flow freely within the gearbox housing and/or into a passage in the gearbox shaft. In some configurations, the fluid may be used to lubricate an interface between the drive shaft and the turbine wheel, and in such case, an interior shaft may extend through the drive shaft to deliver the fluid from the gearbox shaft to the turbine wheel.

To ensure that the fluid remains in designated areas of the gearbox and engine, numerous pieces are typically employed to form a leak-tight seal. In particular, a first end plug may be disposed in the first end of the drive shaft and a first end of the interior shaft extends through the first end plug. An annular flange that extends axially from a coupling plate may be included to mate with the interior shaft first end and to spline with the drive shaft first end. To prevent leakage between the annular flange and the drive shaft first end, a first annular seal may be coupled to the drive shaft first end and is disposed around the annular flange. In some configurations, a second end plug may be disposed in the second end of the drive shaft and the second end of the interior shaft may extend through the second end plug. The second end of the drive shaft may be splined with an end of the gearbox shaft, and a second annular seal may be disposed between the two shafts. In other configurations, a third annular seal may be mounted on an outer surface of the gearbox shaft to prevent fluid from leaking between the gearbox shaft and the gearbox.

Although the aforementioned turbine engines operate adequately, they may be improved. For example, because turbine engines operate in hostile operating environments, such as in high temperatures (e.g., temperatures greater than 480° C.), or may be exposed to non-synchronous vibration and/or high shaft speeds (e.g., speeds greater than 21,000 rotations per minute), the annular seals included in the engine may need relatively frequent replacement. As a result, the turbine engine may be undesirably subjected to frequent repair and downtime.

Accordingly, it is desirable to have a turbine engine and gearbox interface that includes a leak-tight seal capable of operating in hostile operating environments. In addition, it is desirable for the interface to have a longer useful life than conventional turbine engine/gearbox interfaces so that repairs and replacement of the turbine engine components may occur less frequently. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine engine components are provided.

In an embodiment, by way of example only, a turbine engine component includes a shaft and two sets of hollow radial plates. The shaft includes an axial section forming a portion of a main passage having a substantially uniform diameter. The axial section has a first end, a second end, and a center located substantially halfway between the first end and the second end of the axial section. The first set of hollow radial plates extends radially outwardly from the shaft at a first axial location between the center of the axial section and the first end of the axial section. Each hollow radial plate of the first set of hollow radial plates is hollow and has an interior surface defining a first set of annular chambers surrounding and in flow communication with the main passage. The second set of hollow radial plates extends radially outwardly from the shaft at a second axial location between the center of the axial section and the second end of the axial section. Each hollow radial plate of the second set of hollow radial plates has an interior surface defining a second set of annular chambers surrounding and in flow communication with the main passage.

In another embodiment, by way of example only, a turbine engine component includes a shaft and two sets of hollow radial plates. The shaft includes an axial section forming a portion of a main passage having a substantially uniform diameter, and the axial section has a first end, a second end, and a center located substantially halfway between the first end and the second end of the axial section. The first set of hollow radial plates extends radially outwardly from the shaft at a first axial location between the center of the axial section and the first end of the axial section, and each hollow radial plate of the first set of hollow radial plates is hollow and has an interior surface defining a first set of annular chambers surrounding and in flow communication with the main passage. The second set of hollow radial plates extends radially outwardly from the shaft at a second axial location between the center of the axial section and the second end of the axial section, and each hollow radial plate of the second set of hollow radial plates has an interior surface defining a second set of annular chambers surrounding and in flow communication with the main passage. Each hollow radial plate of the first set of hollow radial plates and each hollow radial plate of the second set of hollow radial plates includes a first radial disk, a second radial disk spaced apart axially from the first radial disk, and an outer rim extending axially between the first radial disk and the second radial disk, and the outer rim extends along an axis that is substantially parallel with an axis of rotation of the shaft connecting the first radial disk to the second radial disk.

In still another embodiment, by way of example only, a turbine engine component includes a shaft and two sets of hollow radial plates. The shaft includes an axial section forming a portion of a main passage having a substantially uniform diameter, and the axial section has a first end, a second end, and a center located substantially halfway between the first end and the second end of the axial section. The first set of hollow radial plates extends radially outwardly from the shaft at a first axial location between the center of the axial section and the first end of the axial section. Each hollow radial plate of the first set of hollow radial plates is hollow and has an interior surface defining a first set of annular chambers surrounding and in flow communication with the main passage. The second set of hollow radial plates extends radially outwardly from the shaft at a second axial location between the center of the axial section and the second end of the axial section, and each hollow radial plate of the second set of hollow radial plates has an interior surface defining a second set of annular chambers surrounding and in flow communication with the main passage. Each hollow radial plate of the first set of hollow radial plates and each hollow radial plate of the second set of hollow radial plates includes a first radial disk, a second radial disk spaced apart axially from the first radial disk, and an outer rim extending axially between the first radial disk and the second radial disk, the outer rim being curved and connecting the first radial disk to the second radial disk.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
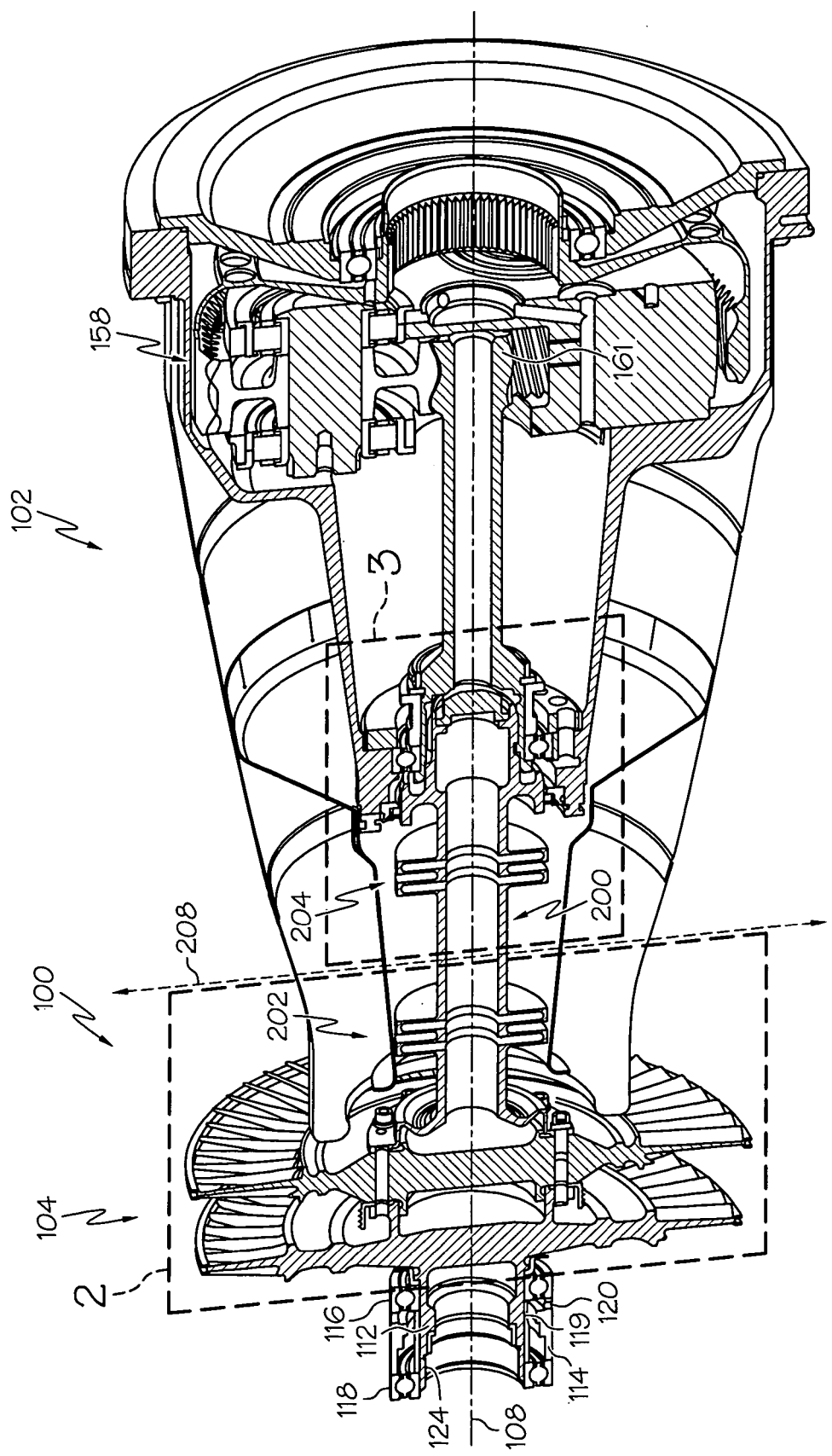
FIG. 1 is a cross-sectional, perspective view of a portion of a power turbine engine and a portion of a gearbox, according to an embodiment.
Figure 2:
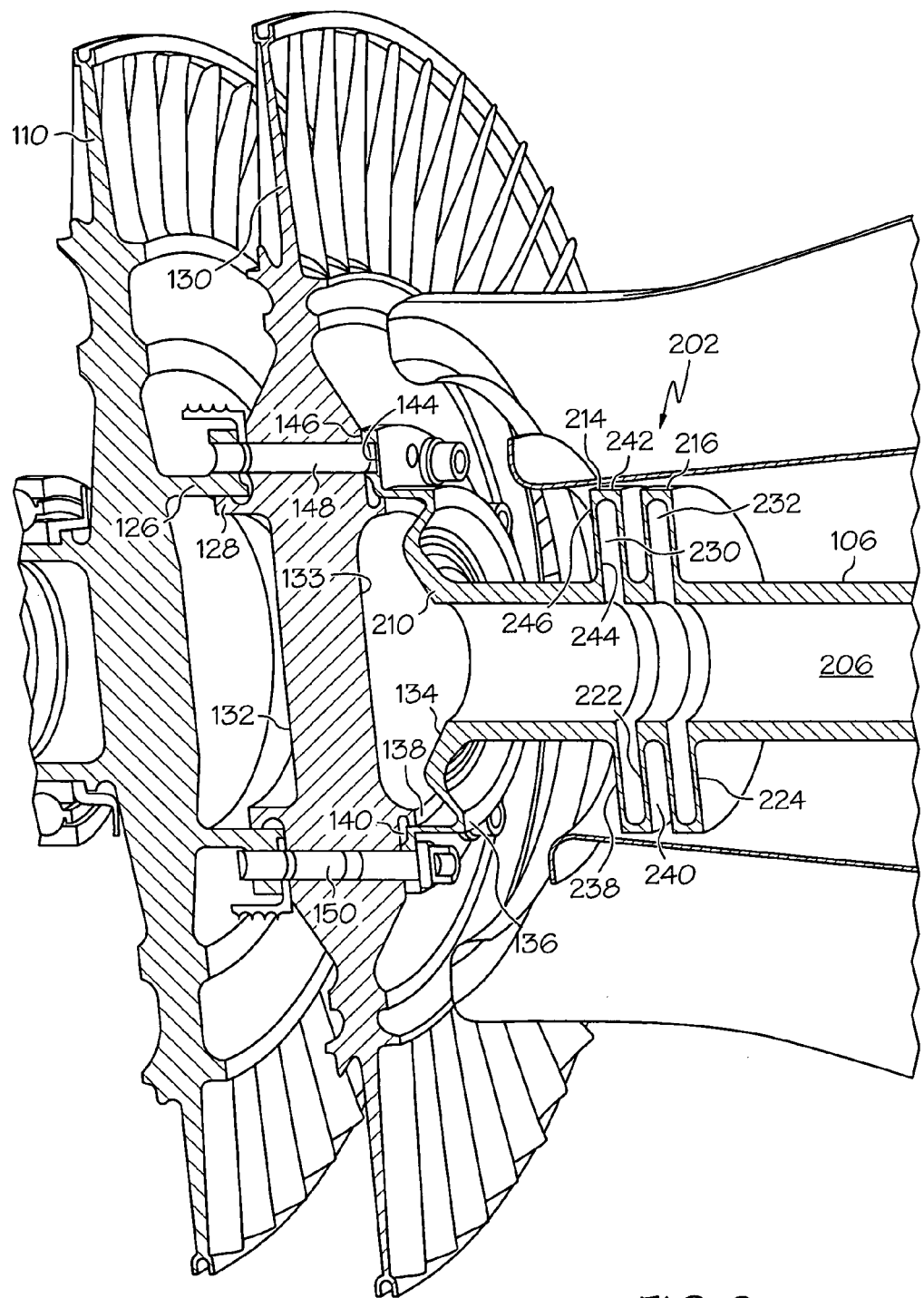
FIG. 2 is a close-up cross-sectional, perspective view of a first portion of the power turbine engine shown in FIG. 1 and indicated by dotted box 2, according to an embodiment.
Figure 3:
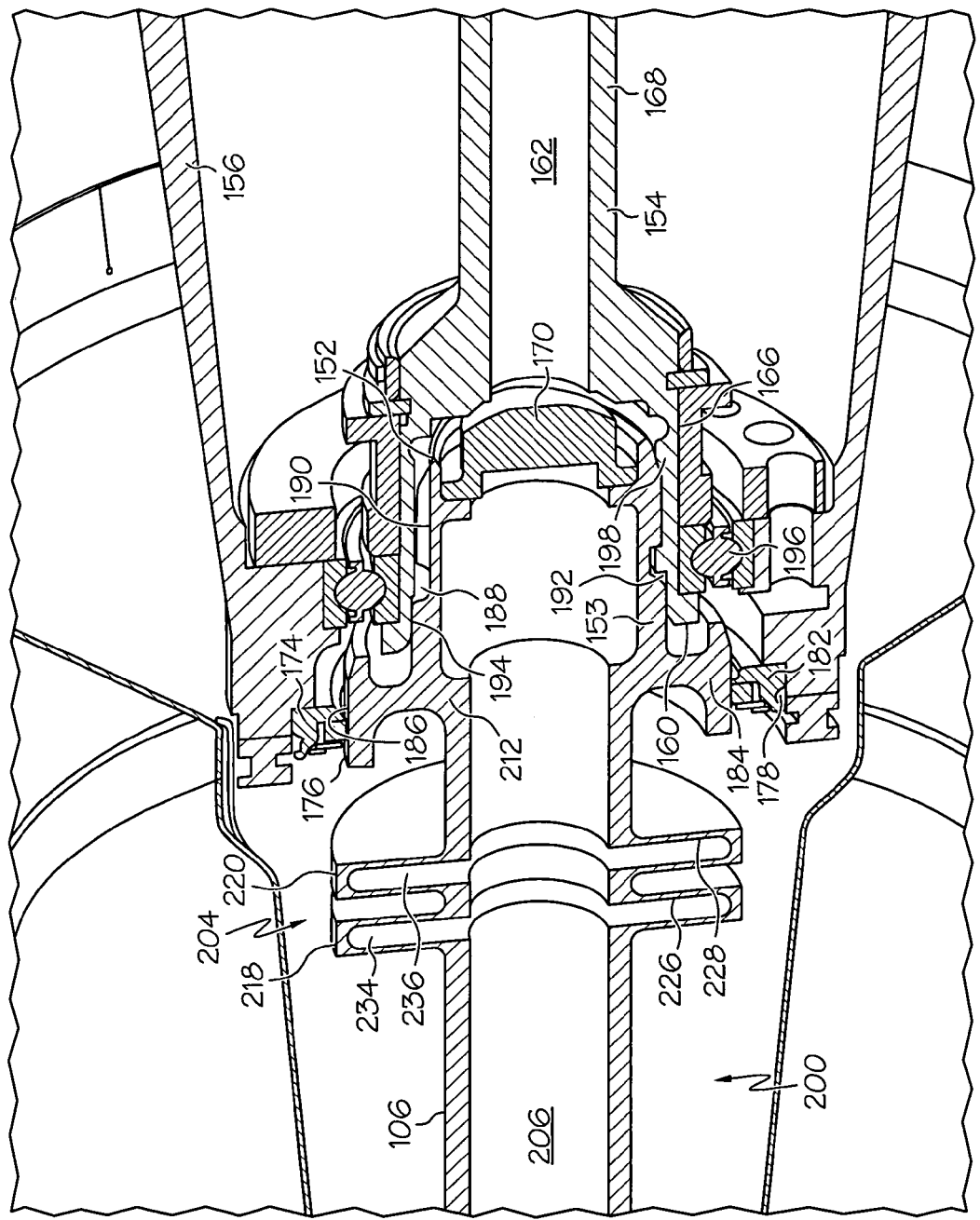
FIG. 3 is a close-up cross-sectional, perspective view of a second portion of the power turbine engine shown in FIG. 1 and indicated by dotted box 3, according to an embodiment.

FIG. 1 is a cross-sectional, perspective view of a portion of a power turbine engine 100 and a portion of a gearbox 102, FIG. 2 is a close-up cross-sectional, perspective view of a first portion of the power turbine engine shown in FIG. 1 and indicated by dotted box 2, and FIG. 3 is a close-up cross-sectional, perspective view of a second portion of the power turbine engine shown in FIG. 1 and indicated by dotted box 3, according to an embodiment. The power turbine engine 100 includes a set of turbines 104 coupled to a power turbine shaft 106. The set of turbines 104 are configured to rotate about a longitudinal axis 108, when combusted air impinges on blades of the turbines 104. In accordance with an embodiment, the set of turbines 104 includes a first turbine 110 and a second turbine 130. The first turbine 110 has an axially-extending stub shaft 112 that is inserted into an inner and outer bearing spacer 114 of the power turbine engine 100. To maintain positioning between the axially-extending stub shaft 112 and the bearing spacer 114, bearing assemblies 116, 118 may be included. For example, one bearing assembly 116 may be disposed between an end 120 of the outer bearing spacer 114 and an inner bearing spacer surface 119 of the axially-extending stub shaft 112, and another bearing assembly 118 may be disposed between an end 124 of the axially-extending stub shaft 112 and the outer bearing spacer 114. Although two bearing assemblies 116, 118 are included, more than two may be implemented in other embodiments. In still other embodiments, one bearing assembly may be included.

The first turbine 110 may have a projection 126 extending axially from a side opposite that of the axially-extending stub shaft 112. The projection 126 mates with a corresponding projection 128 extending from a first side 132 of the second turbine 130. In an embodiment, the projection 126 of the first turbine 110 surrounds the projection 128 of the second turbine 130. In other embodiments, the second turbine projection 128 may surround the first turbine projection 128. Although two turbines 110, 130 are included in the set of turbines 104, more or fewer turbines may be employed in other embodiments. In any case, a second side 133 of the second turbine 130 is coupled to the power turbine shaft 106.

The power turbine shaft 106 is configured to maintain structural integrity when operated at speeds of 22,500 rotations per minute and above or when subjected to operating environments including temperatures greater than about 482° C. In this regard, the power turbine shaft 106 may comprise a material suitable for use in the aforementioned conditions. For example, the power turbine shaft 106 may comprise steel, such as 17-22 steel, titanium or an alloy thereof, a nickel-based alloy, and the like. The power turbine shaft 106 may also be coated with a black oxide coating to help prevent oxidation, in an embodiment.

In accordance with an embodiment, the power turbine shaft 106 has a first end 134 and a second end 152. In an embodiment, the first end 134 includes a coupling plate 136 extending radially outwardly. The coupling plate 136 is configured to substantially eliminate leakage that could occur at an interface between the second side 133 of the second turbine 130 and the power turbine shaft 106. The coupling plate 136 is dimensioned to directly couple to the second side 133 of the second turbine 130. In this regard, the coupling plate 136 may have an outer diameter that is greater than an outer diameter of the power turbine shaft 106 and smaller than an outer diameter of a hub of the second turbine 130. In one example, the second side 133 of the second turbine 130 includes an annular lip 138 that is dimensioned to correspond with an inner surface 140 of the coupling plate 136, and an outer diameter of the annular lip 138 and a diameter of the inner surface 140 of the coupling plate 136 are substantially equal (e.g., ±0.05 cm). For example, the outer diameter of the annular lip 138 and the diameter of the inner surface 140 of the coupling plate 136 may be in a range of from about 8.991 cm to about 8.994 cm. In other embodiments, the diameters may be greater or less than the aforementioned range. According to an embodiment, the annular lip 138 and the coupling plate 136 may be press fit together to provide a leak-proof seal. In such case, the outer diameter of the annular lip 138 and the inner surface 140 of the coupling plate 136 may have diameters in a range of from about 8.989 cm to about 8.992 cm. In other embodiments, the diameters may be greater or less than the aforementioned range.

To further provide leak-tight sealing, the coupling plate 136 may include a mating surface 144 on its outer periphery that is configured to lie substantially flush (e.g., ±0.0025 cm) against a corresponding mating surface 146 on the second turbine 130. In an embodiment, the two mating surfaces 144, 146 are coupled together with fasteners (not shown) that may be received through sets of openings 148, 150 formed in the coupling plate 136 and the second turbine 130. Although two sets of openings 148, 150 are included, more may be employed in other embodiments.

As alluded to above, the second end 152 of the power turbine shaft 106 is coupled to the gearbox 102. In this regard, the power turbine shaft 106 may include a piloted fit and spline section 153 that at least partially extends into the gearbox 102. In one embodiment, the gearbox 102 includes a gearbox shaft 154, a housing 156, and a plurality of gears 158. The gearbox shaft 154 extends through the housing 156 and is coupled at one end 160 to the second end 152 of the power turbine shaft 106 and at a second end 161 to the plurality of gears 158. In an embodiment, the gearbox 102 may include fluid, such as lubricant or oil, which may flow in an interior of the housing 156 and/or through a gearbox passage 162 formed in the gearbox shaft 154.

To maintain the fluid within the gearbox 102, the gearbox shaft 154 and the spline section 153 may be configured to form a leak-tight seal. In one embodiment, the gearbox shaft 154 includes a coupling section 166 having an inner diameter that is substantially equal to an outer diameter of the spline section 153 of the power turbine shaft 106. For example, the inner diameter of the coupling section 166 and the outer diameter of the spline section 153 may be in a range of from about 5.4 cm to about 5.5 cm. In other embodiments, the inner diameter measurements may be greater than or less than the aforementioned ranges. In accordance with another embodiment, the inner diameter of the coupling section 166 may be greater than an inner diameter of a midsection 168 of the gearbox shaft 154. For example, the inner diameter of the coupling section 166 may be in a range of from about 6.499 cm to about 6.501 cm, while the inner diameter of the midsection 168 may be in a range of from about 3.65 cm to about 3.71 cm. In other embodiments, the inner diameter measurements may be greater than or less than the aforementioned ranges. In such embodiments, a seal, such as an O-ring or the like, may be included between the power turbine shaft 106 and the gearbox shaft 154.

According to an embodiment, to prevent fluid from flowing from the gearbox shaft 154 to the second turbine 130, an end plug 170 is disposed in the spline section 153 of the power turbine shaft 106. In such case, the end plug 170 may be disk-shaped and may be made of a material that is substantially resistant to wear and/or erosion when exposed to the fluid. Suitable materials include, but are not limited to titanium, nickel-based alloys, such as Inconel 718, or stainless steel materials, such as 17-22AS. The end plug 170 may have an outer diameter that is substantially equal to an inner diameter of the spline section 153 of the power turbine shaft 106, in accordance with an embodiment. In particular, in accordance with an embodiment, the end plug 170 may have an outer diameter that is substantially equal to an inner diameter of the second end 152 of the power turbine shaft 106 positioned on the spline section 153. For example, the outer diameter of the end plug 170 may be in a range of from about 4.215 cm to about 4.218 cm; however, in other embodiments, the outer diameter may be greater or less than the aforementioned range. In other embodiments, the end plug 170 may have an outer diameter that is smaller than the inner diameter of the second end 152 of the power turbine shaft 106. In such case, and an elastomeric sealing member (not shown) may be included. In other embodiments, the end plug 170 is incorporated as a feature in the power turbine shaft 106.

To further minimize leakage between the power turbine engine 100 and the gearbox 102, an annular seal 174 may be disposed between the outer surface 176 of the power turbine shaft 106 and an inner surface 178 of the gearbox housing 156. For example, the inner surface 178 may include an annular groove 182 having a diameter, and the annular seal 174 may be selected to have an outer diameter that is substantially equal to the annular groove 182 diameter. In an embodiment, the diameters of the annular groove 182 and the annular seal 174 may be in a range of from about 8.89 cm to about 8.90 cm. In other embodiments, the diameters may be greater or less than the aforementioned range. In another example, the outer surface 176 of the power turbine shaft 106 may have an outer diameter that is substantially equal to the inner diameter of the annular seal 174. In an embodiment, the outer surface 176 of the power turbine shaft 106 and the inner diameter of the annular seal 174 may be in a range of from about 8.88 cm to about 8.91 cm. In other embodiments, the diameters may be greater or less than the aforementioned range.

In some embodiments, an annular flange 184 may extend from the outer surface 176 of the power turbine shaft 106 to provide an axial surface 186 onto which the annular seal 174 is mounted, and the axial surface 186 has an outer diameter that is substantially equal to the inner diameter of the annular seal 174. A piloting feature may be included between the spline section 153 of the power turbine shaft 106 and the end of the gearbox shaft 154 to ensure positioning of the annular seal 174. For example, the piloting feature may include an annular ridge 188 on an outer surface 190 of the power turbine shaft 106, which may seat against a corresponding pilot 192 extending radially inwardly from an inner surface 194 of the gearbox shaft 154. The pilot 192 may be an inwardly-extending tab, or may be an inwardly-extending annular member.

Axial and radial loads of the gearbox shaft 154 and the power turbine shaft 106 may be supported by a bearing assembly 196. In an embodiment, the bearing assembly 196 is mounted onto the outer surface 198 of the gearbox shaft 154 between the gearbox shaft 154 and the inner surface 178 of the gearbox housing 156. In accordance with an embodiment, the bearing assembly 196 is located at an axial position such that the assembly 196 also surrounds the power turbine shaft 106. In one example, the bearing assembly 196 may be located between the annular flange 184 (if included) and the second end 152 of the power turbine shaft 106.

In accordance with an embodiment, the power turbine shaft 106 may be further configured to compensate for misalignment that could occur during engine operation and/or to transfer torque between the power turbine engine 100 and gearbox 102. In this regard, the power turbine shaft 106 includes an axial section 200 having first and second sets of hollow radial plates 202, 204. The axial section 200 is located between the coupling plate 136 and the outer surface 176 of the power turbine shaft 106. In an embodiment, the axial section 200 may have a length in a range of from about 10.3 cm to about 10.5 cm. In other embodiments, the length of the axial section 200 may be longer or shorter. According to an embodiment, a main passage 206 is defined by a portion of an inner surface of the power turbine shaft 106 having a substantially uniform diameter along its axial length. In an embodiment, the diameter of the main passage 206 may be smaller than an inner diameter of the coupling plate 136 and an inner diameter of the pilot and spline section 153. According to an embodiment, the diameter of the main passage 206 may be in a range of from about 4.33 cm to about 4.36 cm. In other examples, the diameter may be larger or smaller than the aforementioned range.

The axial section 200 has a center (indicated by dotted line 208) located between a first end 210 and a second end 212. The center 208 may be located substantially halfway between the first end 210 and the second end 212. According to an embodiment, the first set of hollow radial plates 202 extends radially outwardly from the power turbine shaft 106 at a first axial location between the center 208 and first end 210 of the axial section 200, and the second set of hollow radial plates 204 extends radially outwardly from the power turbine shaft 106 at a second axial location between the center 208 and second end 212 of the axial section 200. According to an embodiment, the first axial location may be located substantially equidistant from the center 208 and the first end 210 of the axial section 200. In another embodiment, the first axial location may be located at any other location between the center 208 and the first end 210 of the axial section 200. The second axial location may be located substantially equidistant from the center 208 and the second end 212 of the axial section 200, in an embodiment. In another embodiment, the second axial location may be located at any other location between the center 208 and the second end 212 of the axial section 200. In accordance with another embodiment, a distance between the first and second sets of hollow radial plates 202, 204 may be in a range of from about 12.85 cm to about 13.06 cm. In other embodiments, the distance between the sets of hollow radial plates 202, 204 may be greater or less than the aforementioned range.

Two hollow radial plates 214, 216 are included in the first set 202, and two hollow radial plates 218, 220 are included in the second set 204. However, in other embodiments, one hollow radial plate or more than two hollow radial plates may be included in each set 202, 204. In still other embodiments, although each set 202, 204 preferably includes an equal number of total hollow radial plates, one set 202 may have more hollow radial plates than the other set 204, or vice versa.

Each hollow radial plate 214, 216, 218, 220 has an interior surface 222, 224, 226, 228 that defines annular chambers 230, 232, 234, 236 surrounding and in flow communication with the main passage 206. For simplicity, description will be provided with reference to hollow radial plate 214, however, it will be appreciated that the description may be applied to one or more of the hollow radial plates 216, 218, 220 included on the power turbine shaft 106. In any case, the hollow radial plate 214 includes a first radial disk 238, a second radial disk 240, and an outer rim 242. In an embodiment, the first radial disk 238 may have an outer diameter that is in a range of about 9.38 cm to about 9.41 cm. In another embodiment, the outer diameter may be greater than or less than the aforementioned range. The second radial disk 240 may also have an outer diameter in a range of from about 9.38 cm to about 9.41 cm. However, in other embodiments, the diameter may be greater or less than the aforementioned range. Although both radial disks 238, 240 are shown as having substantially equal outer diameters, this may not be the case in other embodiments. For example, the outer diameter of the first radial disk 238 may be larger than the outer diameter of the second radial disk 240, or vice versa.

In any case, the two radial disks 238, 240 are spaced axially a predetermined distance apart from each other. The predetermined distance may be selected based on a desired flexibility to be provided by the power turbine shaft 106. In some embodiments, the predetermined distance may also be selected based on a total number of hollow radial plates 214, 216, 218, 220 that may be included in each set of hollow radial plates 202, 204. In another embodiment, the predetermined distance may be in a range of from about 0.22 cm to about 0.28 cm. In other embodiments, the predetermined distance may be greater than or less than the aforementioned range. Each radial disk 238, 240 may have a thickness defined as a shortest distance between an inner surface 244 and an outer surface 246. In an embodiment, the thickness of each radial disk 238, 240 is in a range of from about 0.081 cm to about 0.097 cm. In other embodiments, the thicknesses may be greater or less than the aforementioned thickness range. Additionally, although the radial disks 238, 240 may have substantially equal thicknesses in one embodiment, they may have unequal thicknesses in other embodiments. Generally, thinner radial disks, in conjunction with larger outer diameters, provide the power turbine shaft with increased flexibility. Thus, if more flexibility is desired, the radial disks may have thicknesses in a range of from about 0.080 cm to about 0.102 cm, and outer diameters in a range of from about 8.89 cm to about 11.43 cm. If more rigidity is desired, the radial disks may have thicknesses in a range of from about 0.105 cm to about 0.135 cm, and outer diameters in a range of from about 6.35 cm to about 8.88 cm.

The particular dimensions of the radial disk 238, 240 may also depend on a particular embodiment of the outer rim 242. In one embodiment, the outer rim 242 may extend between the radial disks 238, 240 along an axis that is substantially parallel to an axis of rotation of the power turbine shaft 106. Hence, the outer rim 242 may have an outer diameter that is substantially equal to an outer diameter of the first and second radial disks 238, 240. In another embodiment, a first and a second interface may be formed between the outer rim 242 and the first radial disk 238 and between the outer rim 242 and the second radial disk 240. The interfaces may be reinforced with additional material and thus, may have thicknesses that are greater than the thicknesses of each of the radial disks 238, 240 and the outer rim 242. In other embodiments, the outer rim 242 may form overhangs that extend axially past one or both of the radial disks 238, 240. In such case, the overhangs may have thicknesses that are greater than a thickness of each of the radial disks 238, 240 and the outer rim 242. In other embodiments, overhangs may not be included. In any case, in an embodiment, the thickness of the outer rim 242 is in a range of from about 0.24 cm to about 0.27 cm. However, in other embodiments, the thickness may be greater or less than the aforementioned thickness range.

Figure 4:
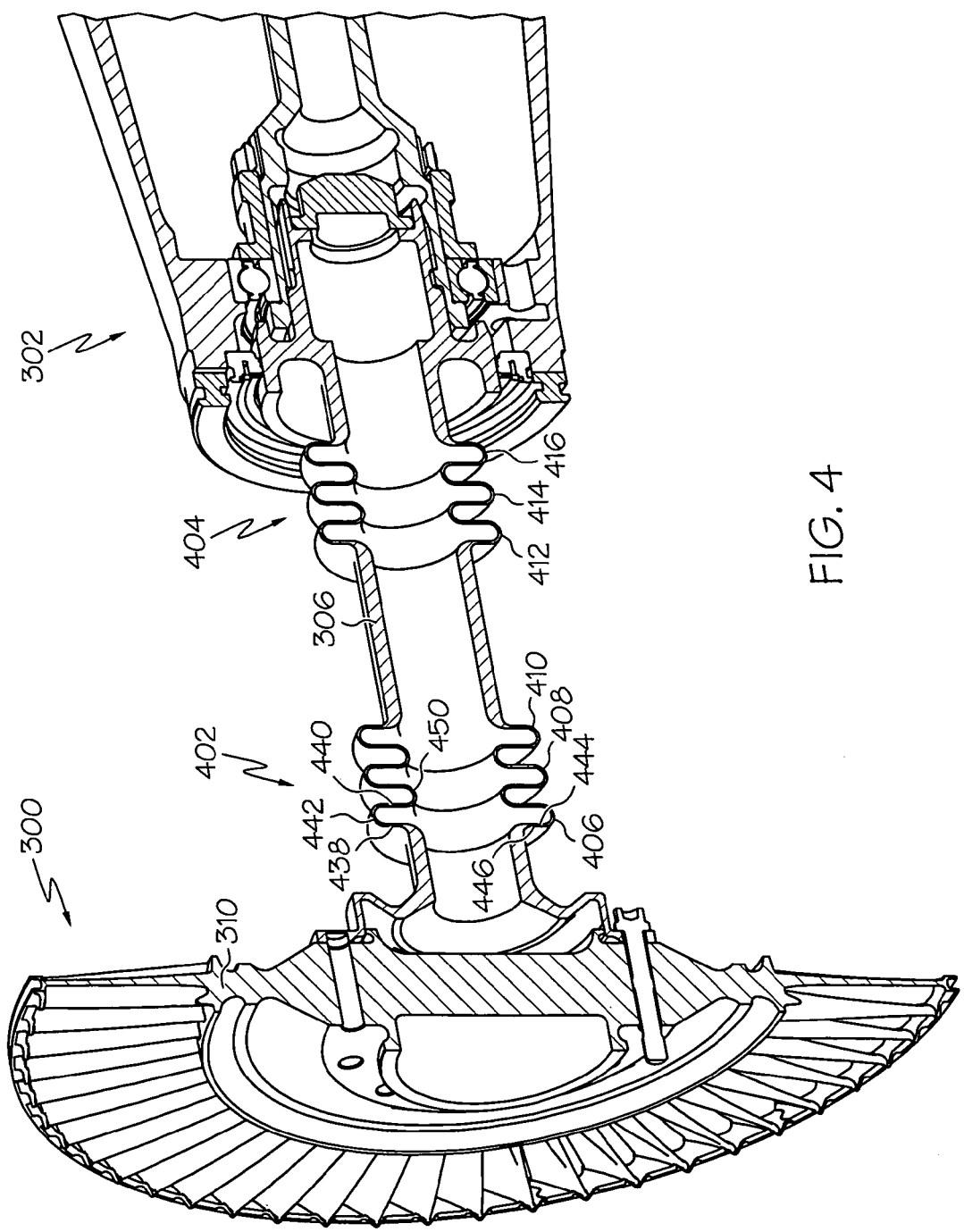
FIG. 4 is a cross-sectional, perspective view of a portion of a power turbine engine and a portion of a gearbox, according to another embodiment.

Turning to FIG. 4, a cross-sectional, side view is provided of a portion of a power turbine engine 300 and a portion of a gearbox 302, according to another embodiment. Here, the power turbine engine 300 and gearbox 302 are configured substantially similarly to power turbine engine 200 and gearbox 202 of FIG. 1, except that the power turbine engine 300 includes a power turbine shaft 306 in which a first and a second set of hollow radial disks 402, 404 have curved outer rims. Additionally, each set of hollow radial disks 402, 404 includes three hollow radial plates 406, 408, 410, 412, 414, 416. However, in other embodiments, two hollow radial plates or more than three hollow radial plates may be included in each set 402, 404. In still other embodiments, although each set 402, 404 preferably includes an equal number of total hollow radial plates, one set 402 may have more hollow radial plates than the other set 404, or vice versa.

For simplicity, a description will be provided with reference to radial plate 406. However, it will be appreciated that one or more of the hollow radial plates 408, 410, 412, 414, 416 may be substantially identically configured. According to an embodiment, the hollow radial plate 406 includes a first radial disk 438 and a second radial disk 440. The first and second radial disks 438, 440 have substantially equal outer diameters and are connected by an outer rim 442 that is curved. In this embodiment, the outer rim 442 may have an outer diameter in a range of from about 6.858 cm to about 6.910 cm. In other embodiments, the outer diameter may be greater or less than the aforementioned range. Additionally, each radial disk 438, 440 and the outer rim 442 has a thickness (e.g., a shortest distance between an inner surface 444 and an outer surface 446 of the radial plate 406) that is substantially uniform across an entirety of its area. Generally, thinner radial disks, in conjunction with larger outer diameters, provide the power turbine shaft with increased flexibility. Also, the number of hollow radial plates and the spacing between individual hollow radial plates as well as the spacing between the groups can be used to control stiffness or flexibility accordingly.

In an embodiment, adjacent hollow radial plates 406 and 408 (or hollow radial plates 408 and 410, hollow radial plates 412 and 414, or hollow radial plates 414 and 416) may include a curved section 450 therebetween. The curved section 450 may be made by part of the power turbine shaft 306. In such case, the curved section 450 may also have a thickness that is substantially equal to the thicknesses of each of the radial disks 438, 440 and the outer rim 442. For example, the thicknesses may be in a range of from about 0.080 cm to about 0.102 cm. In other embodiments, the thicknesses may be greater or less than the aforementioned range, but generally may be selected based on a magnitude of torque that may be transferred between a turbine wheel 310 and a component (not shown) coupled to the gearbox 302, as well as on misalignment issues.

By including two sets of spaced apart hollow radial disks (e.g., sets 202, 204 and sets 402, 404), the power turbine shaft may be capable of deflection when subjected to misalignment. In particular, if opposing radial loads are applied to different axial locations on the power turbine shaft, an axial section of the power turbine shaft can flex in a first radial direction while a second axial section of the power turbine shaft flexes in a second radial direction that may be opposite the first radial direction. Moreover, by eliminating a spline between the turbine wheel and the power turbine shaft, lubrication between the two components is unnecessary and hence, sealing therebetween becomes optional. Additionally, because fewer seals are included, the turbine engine and gearbox may have longer useful lives than conventional turbine engine/gearbox interfaces. Hence, repairs and replacement of the turbine engine components may occur less frequently.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine engine component, comprising:
   a shaft having a first end coupled to a turbine of a turbine engine and a second end including a spline section for coupling to a driven component, the shaft further including an axial section forming a portion of a main passage having a substantially uniform diameter, the axial section having a first end, a second end, and a center located substantially halfway between the first end and the second end of the axial section;
   a first set of hollow radial plates extending radially outwardly from the shaft at a first axial location between the center of the axial section and the first end of the axial section, each hollow radial plate of the first set of hollow radial plates being hollow and having an interior surface defining a first set of annular chambers surrounding and in flow communication with the main passage; and
   a second set of hollow radial plates extending radially outwardly from the shaft at a second axial location between the center of the axial section and the second end of the axial section, each hollow radial plate of the second set of hollow radial plates having an interior surface defining a second set of annular chambers surrounding and in flow communication with the main passage, wherein the shaft and the first and second sets of hollow radial plates are integrally formed as a single structure.

2. The turbine engine component of claim 1, wherein each hollow radial plate of the first set of hollow radial plates has a substantially equal outer diameter.

3. The turbine engine component of claim 1, wherein each hollow radial plate of the first set of hollow radial plates and each hollow radial plate of the second set of hollow radial plates have substantially equal outer diameters.

4. The turbine engine component of claim 1, wherein the first set of hollow radial plates includes two hollow radial plates.

5. The turbine engine component of claim 4, wherein the second set of hollow radial plates includes two hollow radial plates.

6. The turbine engine component of claim 1, wherein the first set of hollow radial plates includes more than two hollow radial plates.

7. The turbine engine component of claim 6, wherein the second set of hollow radial plates includes more than two hollow radial plates.

8. The turbine engine component of claim 1, wherein each hollow radial plate of the first set of hollow radial plates and each hollow radial plate of the second set of hollow radial plates includes a first radial disk, a second radial disk spaced apart axially from the first radial disk, and an outer rim extending axially between the first radial disk and the second radial disk.

9. The turbine engine component of claim 8, wherein the outer rim extends along an axis that is substantially parallel with an axis of rotation of the shaft and connects the first radial disk to the second radial disk.

10. The turbine engine component of claim 8, wherein the outer rim is curved and connects the first radial disk to the second radial disk.

11. The turbine engine component of claim 8, wherein the first radial disk, the second radial disk, and the outer rim are substantially uniform in thicknesses.

12. A turbine engine component, comprising:
   a shaft having a first end coupled to a turbine of a turbine engine and a second end including a spline section for coupling to a component, the shaft further including an axial section forming a portion of a main passage having a substantially uniform diameter, the axial section having a first end, a second end, and a center located substantially halfway between the first end and the second end of the axial section;
   a first set of hollow radial plates extending radially outwardly from the shaft at a first axial location between the center of the axial section and the first end of the axial section, each hollow radial plate of the first set of hollow radial plates being hollow and having an interior surface defining a first set of annular chambers surrounding and in flow communication with the main passage; and a second set of hollow radial plates extending radially outwardly from the shaft at a second axial location between the center of the axial section and the second end of the axial section, each hollow radial plate of the second set of hollow radial plates having an interior surface defining a second set of annular chambers surrounding and in flow communication with the main passage, wherein the shaft and the first and second sets of hollow radial plates are integrally formed as a single structure and each hollow radial plate of the first set of hollow radial plates and each hollow radial plate of the second set of hollow radial plates includes a first radial disk, a second radial disk spaced apart axially from the first radial disk, and an outer rim extending axially between the first radial disk and the second radial disk, and the outer rim extends along an axis that is substantially parallel with an axis of rotation of the shaft connecting the first radial disk to the second radial disk.

13. The turbine engine component of claim 12, wherein each hollow radial plate of the first set of hollow radial plates has a substantially equal outer diameter.

14. The turbine engine component of claim 12, wherein each hollow radial plate of the first set of hollow radial plates and each hollow radial plate of the second set of hollow radial plates have substantially equal outer diameters.

15. The turbine engine component of claim 12, wherein the first set of hollow radial plates includes two hollow radial plates.

16. The turbine engine component of claim 15, wherein the second set of hollow radial plates includes two hollow radial plates.

17. A turbine engine component, comprising:

a shaft having a first end coupled to a turbine of a turbine engine and a second end including a spline section for coupling to a component, the shaft further including an axial section forming a portion of a main passage having a substantially uniform diameter, the axial section having a first end, a second end, and a center located substantially halfway between the first end and the second end of the axial section;

a first set of hollow radial plates extending radially outwardly from the shaft at a first axial location between the center of the axial section and the first end of the axial section, each hollow radial plate of the first set of hollow radial plates being hollow and having an interior surface defining a first set of annular chambers surrounding and in flow communication with the main passage; and a second set of hollow radial plates extending radially outwardly from the shaft at a second axial location between the center of the axial section and the second end of the axial section, each hollow radial plate of the second set of hollow radial plates having an interior surface defining a second set of annular chambers surrounding and in flow communication with the main passage, wherein the shaft and the first and second sets of hollow radial plates are integrally formed as a single structure and each hollow radial plate of the first set of hollow radial plates and each hollow radial plate of the second set of hollow radial plates includes a first radial disk, a second radial disk spaced apart axially from the first radial disk, and an outer rim extending axially between the first radial disk and the second radial disk, the outer rim being curved and connecting the first radial disk to the second radial disk.

18. The turbine engine component of claim 17, wherein the first radial disk, the second radial disk, and the outer rim are substantially uniform in thicknesses.

19. The turbine engine component of claim 17, wherein the first set of hollow radial plates includes more than two hollow radial plates.

20. The turbine engine component of claim 19, wherein the second set of hollow radial plates includes more than two hollow radial plates.

* * * * *